(12) United States Patent
Barsness et al.

(10) Patent No.: US 9,183,283 B2
(45) Date of Patent: *Nov. 10, 2015

(54) INSERTING DATA INTO AN IN-MEMORY DISTRIBUTED NODAL DATABASE

(71) Applicant: International Business Machines Corporation, Armonk, NY (US)

(72) Inventors: Eric L. Barsness, Pine Island, MN (US); David L. Darrington, Rochester, MN (US); Amanda Randles, Cambridge, MA (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/786,554

(22) Filed: Mar. 6, 2013

(65) Prior Publication Data
US 2013/0185301 A1    Jul. 18, 2013

Related U.S. Application Data

(63) Continuation of application No. 11/861,343, filed on Sep. 26, 2007, now Pat. No. 8,892,558.

(51) Int. Cl.
*G06F 17/30* (2006.01)

(52) U.S. Cl.
CPC .... *G06F 17/30705* (2013.01); *G06F 17/30563* (2013.01); *G06F 17/30598* (2013.01)

(58) Field of Classification Search
USPC ........................................................ 707/737
See application file for complete search history.

(56) References Cited

U.S. PATENT DOCUMENTS

| | | | |
|---|---|---|---|
| 5,418,957 | A | 5/1995 | Narayan |
| 5,452,445 | A | 9/1995 | Hallmark et al. |
| 5,561,797 | A | 10/1996 | Gilles et al. |
| 5,687,369 | A | 11/1997 | Li |
| 5,740,408 | A | 4/1998 | Bonne et al. |
| 5,802,303 | A | 9/1998 | Yamaguchi |
| 5,819,083 | A | 10/1998 | Chen et al. |
| 5,937,402 | A | 8/1999 | Pandit |
| 5,970,495 | A | 10/1999 | Baru et al. |
| 6,363,401 | B2 | 3/2002 | Yahya et al. |
| 6,377,950 | B1 | 4/2002 | Peters et al. |
| 6,457,021 | B1 | 9/2002 | Berkowitz et al. |
| 6,457,085 | B1 | 9/2002 | Reddy |

(Continued)

OTHER PUBLICATIONS

Watson et al., "The System Management of the ICL Goldrush Parallel Database Server", Technical Report: Newcastle-CS#TR96-548, Year of Publication: 1996, accessed online at <http://www.cs.ncl.ac.uk/publications/inproceedings/papers/660.pdf> on Feb. 13, 2009.

(Continued)

*Primary Examiner* — Amresh Singh
(74) *Attorney, Agent, or Firm* — Martin & Associates, LLC; Bret J. Petersen (57) ABSTRACT

A database loader loads data to an in-memory database across multiple nodes in a parallel computing system. The database loader uses SQL flags, historical information gained from monitoring prior query execution times and patterns, and node and network configuration to determine how to effectively cluster data attributes across multiple nodes. The database loader may also allow a system administrator to force placement of database structures in particular nodes.

15 Claims, 7 Drawing Sheets

(56) References Cited

U.S. PATENT DOCUMENTS

| | | |
|---|---|---|
| 6,604,103 B1 | 8/2003 | Wolfe |
| 6,625,141 B1 | 9/2003 | Glitho et al. |
| 7,000,141 B1 | 2/2006 | Karlsson et al. |
| 7,080,139 B1 | 7/2006 | Briggs et al. |
| 7,243,112 B2 | 7/2007 | Qu et al. |
| 7,263,695 B1 | 8/2007 | Muzaffar et al. |
| 7,328,176 B2 | 2/2008 | Tarvydas et al. |
| 7,433,874 B1 | 10/2008 | Wolfe |
| 7,448,035 B2 | 11/2008 | Dorrance et al. |
| 7,526,493 B2 | 4/2009 | Betts et al. |
| 7,640,451 B2 | 12/2009 | Meyer et al. |
| 7,664,799 B2 | 2/2010 | Mukherjee et al. |
| 2002/0087500 A1 | 7/2002 | Berkowitz et al. |
| 2002/0129115 A1 | 9/2002 | Noordergraaf et al. |
| 2002/0184239 A1 | 12/2002 | Mosher et al. |
| 2003/0028509 A1* | 2/2003 | Sah et al. ........................... 707/1 |
| 2003/0072263 A1 | 4/2003 | Peterson |
| 2004/0107381 A1 | 6/2004 | Bomfim et al. |
| 2005/0080796 A1 | 4/2005 | Midgley |
| 2006/0040711 A1 | 2/2006 | Whistler |
| 2007/0088970 A1 | 4/2007 | Buxton et al. |
| 2007/0208686 A1 | 9/2007 | Gupta et al. |
| 2007/0220059 A1 | 9/2007 | Lu et al. |
| 2007/0239661 A1 | 10/2007 | Cattell et al. |
| 2007/0239790 A1 | 10/2007 | Cattell et al. |
| 2007/0288537 A1 | 12/2007 | Bourbonnais et al. |
| 2007/0288900 A1 | 12/2007 | Lev et al. |
| 2008/0027920 A1 | 1/2008 | Schipunov et al. |
| 2008/0027957 A1* | 1/2008 | Bruckner et al. ............. 707/101 |
| 2008/0040561 A1 | 2/2008 | Bryant et al. |
| 2008/0163222 A1 | 7/2008 | Bourbonnais et al. |

OTHER PUBLICATIONS

Dempster et al., "A Tool for Supporting the Teaching of Parallel Database Systems", IEEE Transactions on Education, vol. 48, No. 2, May 2005, pp. 238-247, accessed online at <http://ieeexplore.ieee.org/ielx5/13/30826/01427873.pdf?arnumber=1427873> on Feb. 13, 2009.

Hua et al., "Including the Load Balancing Issue in the Optimization of Multi-way Join Queries for Shared-Nothing Database Computers", IEEE, 1993, pp. 74-83, accessed online at <http://ieeexplore.ieee.org/stamp/stamp.jsp?arnumber=00253068> on Aug. 4, 2009.

Hua et al., "Dynamic Load Balancing in Very Large Shared-Nothing Hypercube Database Computer", IEEE 1993, pp. 1425-1439, accessed online at <http://ieeexplore.ieee.org/stamp/stamp.jsp?arnumber=00260633> on Aug. 4, 2009.

Sokolinsky, L.B., "Organization of Parallel Query Processing in Multiprocessor Database Machines with Hierarchical Architecture", Programming and Computer Software, vol. 27, No. 6, 2001, pp. 297-308, accessed online at <http://www.springerlink.com/content/r55x564303787918/fulltext.pdf> on Aug. 4, 2009.

Hirano et al., "Load Balancing Algorithms for Parallel Database Processing on Shared Memory Multiprocessor", IEEE, 1991, pp. 210-217, accessed online at <http://ieeexplore.ieee.org/stamp/stamp.jsp?tp=&arnumber=1831 05&isnumber=4715> on Aug. 4, 2009.

* cited by examiner

Node File - Historical Information 500

| Node ID | Timestamp | Current Utilization | Future Utilization | Availability |
|---|---|---|---|---|
| | | | | |
| | | | | |

Network File - Historical Information 600

| Network ID | Timestamp | Current Utilization | Future Utilization | Availability |
|---|---|---|---|---|
| | | | | |
| | | | | |

Query File - Historical Information 700

| Query ID | Network Used | Elapsed Time | Node List | Priority |
|---|---|---|---|---|
| | | | | |
| | | | | |

INSERTING DATA INTO AN IN-MEMORY DISTRIBUTED NODAL DATABASE

CROSS REFERENCE TO PARENT APPLICATION

This application is a continuation of U.S. Ser. No. 11/861,343 filed Sep. 26, 2007, which is incorporated herein by reference.

BACKGROUND

1. Technical Field

The claims herein generally relate to computer database systems, and more specifically relate to inserting data into an in-memory distributed nodal database such as in the memory of a massively parallel super computer.

2. Background Art

Supercomputers and other highly interconnected computers continue to be developed to tackle sophisticated computing jobs. One type of highly interconnected computer system is a massively parallel computer system. A family of such massively parallel computers is being developed by International Business Machines Corporation (IBM) under the name Blue Gene. The Blue Gene/L system is a high density, scalable system in which the current maximum number of compute nodes is 65,536. The Blue Gene/L node consists of a single ASIC (application specific integrated circuit) with 2 CPUs and memory. The full computer is housed in 64 racks or cabinets with 32 node boards in each rack.

Computer systems such as Blue Gene have a large number of nodes, each with its own processor and memory. This characteristic provides the opportunity to provide an in-memory database, where some portions of the database, or the entire database resides completely in-memory. An in-memory database could provide an extremely fast response time for searches or queries of the database. However, an in-memory database poses new challenges for computer databases administrators to load the data into the memory of the nodes to take full advantage of the in-memory database.

The prior application referenced above describes an apparatus and method for pre-loading an in-memory database in a parallel computing system. It describes how a node manager uses empirical evidence gained from monitoring prior query execution times and patterns to determine how to effectively load the in-memory database. The structure of the database is analyzed to determine effective ways to pre-load the database.

Another challenge for an in-memory database is how to cluster data records that may span across multiple nodes of the in-memory database. The database will need to determine where records or parts of records will be stored in the memory of the different nodes.

Without a way to effectively manage record placement in an in-memory database, parallel computer systems will not be able to fully utilize the potential power of an in-memory database.

BRIEF SUMMARY

An apparatus and method is described for adding data across multiple nodes to an in-memory database in a parallel computing system. A database loader uses SQL flags, historical information gained from monitoring prior query execution times and patterns, and node and network configuration to determine how to effectively cluster data attributes across multiple nodes. The database loader may also allow a system administrator to force placement of database structures in particular nodes.

The description and examples herein are directed to a massively parallel computer system such as the Blue Gene architecture, but the claims herein expressly extend to other parallel computer systems with multiple processors arranged in a network structure.

The foregoing and other features and advantages will be apparent from the following more particular description, and as illustrated in the accompanying drawings.

BRIEF DESCRIPTION OF DRAWINGS

The disclosure will be described in conjunction with the appended drawings, where like designations denote like elements, and.

DETAILED DESCRIPTION

The description and claims herein are directed to a method and apparatus for pre-loading an in-memory database in a parallel computing system. The examples herein will be described with respect to the Blue Gene/L massively parallel computer developed by International Business Machines Corporation (IBM). A database loader uses SQL flags and historical information gained from monitoring prior query execution times and patterns to determine how to effectively cluster data attributes across multiple nodes. The database loader can also utilize node and network configuration information to determine how to cluster the data attributes. The node manager may also allow a system administrator to force placement of structures in particular nodes.

Figures 1, 2:
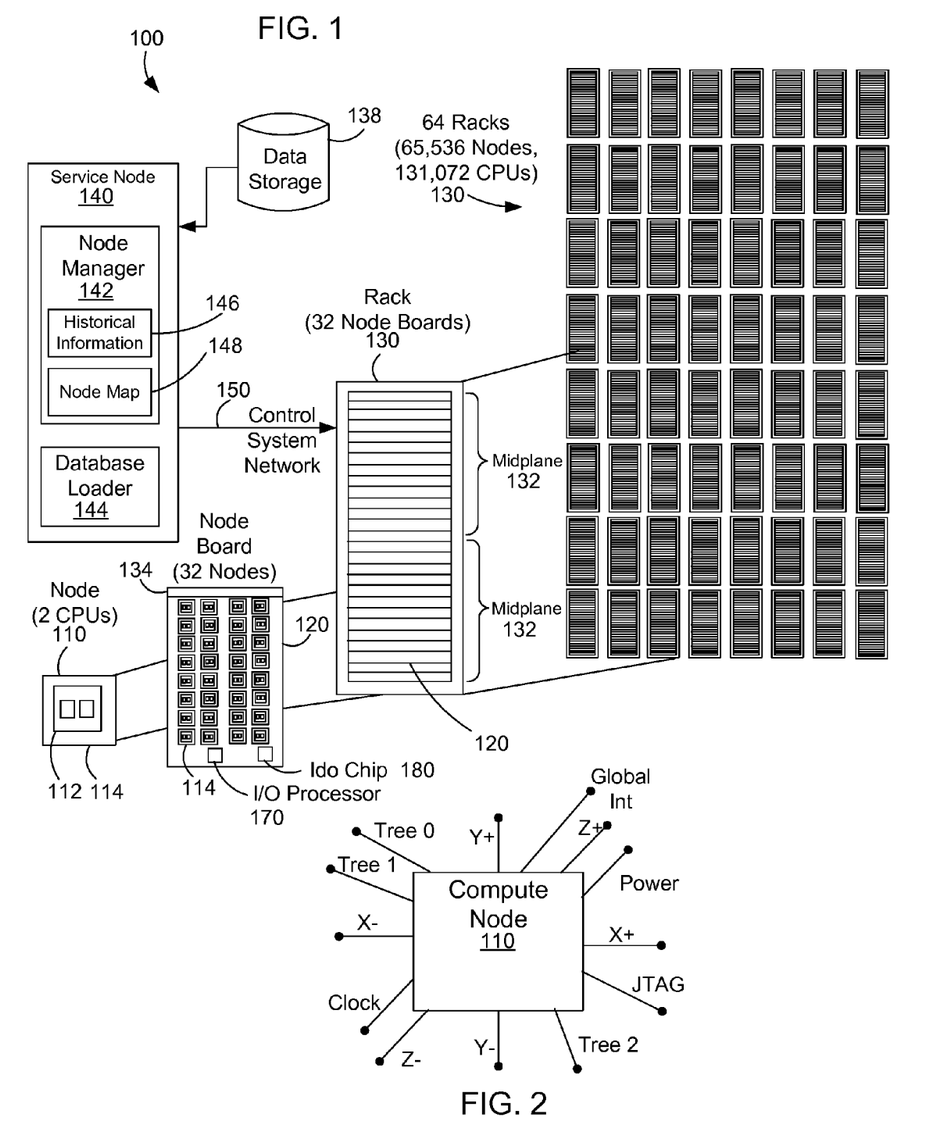
FIG. 1 is a block diagram of a massively parallel computer system.
FIG. 2 is a block diagram of a compute node in a massively parallel computer system according to the prior art.

FIG. 1 shows a block diagram that represents a massively parallel computer system 100 such as the Blue Gene/L computer system. The Blue Gene/L system is a scalable system in which the maximum number of compute nodes is 65,536. Each node 110 has an application specific integrated circuit (ASIC) 112, also called a Blue Gene/L compute chip 112. The compute chip incorporates two processors or central processor units (CPUs) and is mounted on a node daughter card 114. The node also typically has 512 megabytes of local memory (not shown). A node board 120 accommodates 32 node daughter cards 114 each having a node 110. Thus, each node board has 32 nodes, with 2 processors for each node, and the associated memory for each processor. A rack 130 is a housing that contains 32 node boards 120. Each of the node boards 120 connect into a midplane printed circuit board 132 with a midplane connector 134. The midplane 132 is inside the rack and not shown in FIG. 1. The full Blue Gene/L computer system would be housed in 64 racks 130 or cabinets with 32 node boards 120 in each. The full system would then have 65,536 nodes and 131,072 CPUs (64 racks×32 node boards× 32 nodes×2 CPUs).

The Blue Gene/L computer system structure can be described as a compute node core with an I/O node surface, where communication to 1024 compute nodes 110 is handled by each I/O node that has an I/O processor 170 connected to the service node 140. The I/O nodes have no local storage. The I/O nodes are connected to the compute nodes through the logical tree network and also have functional wide area network capabilities through a gigabit ethernet network (not shown). The gigabit Ethernet network is connected to an I/O processor (or Blue Gene/L link chip) 170 located on a node board 120 that handles communication from the service node 160 to a number of nodes. The Blue Gene/L system has one or more I/O processors 170 on an I/O board (not shown) connected to the node board 120. The I/O processors can be configured to communicate with 8, 32 or 64 nodes. The service node is uses the gigabit network to control connectivity by communicating to link cards on the compute nodes. The connections to the I/O nodes are similar to the connections to the compute node except the I/O nodes are not connected to the torus network.

Again referring to FIG. 1, the computer system 100 includes a service node 140 that handles the loading of the nodes with software and controls the operation of the whole system. The service node 140 is typically a mini computer system such as an IBM pSeries server running Linux with a control console (not shown). The service node 140 is connected to the racks 130 of compute nodes 110 with a control system network 150. The control system network provides control, test, and bring-up infrastructure for the Blue Gene/L system. The control system network 150 includes various network interfaces that provide the necessary communication for the massively parallel computer system. The network interfaces are described further below.

The service node 140 manages the control system network 150 dedicated to system management. The control system network 150 includes a private 100-Mb/s Ethernet connected to an Ido chip 180 located on a node board 120 that handles communication from the service node 160 to a number of nodes. This network is sometime referred to as the JTAG network since it communicates using the JTAG protocol. All control, test, and bring-up of the compute nodes 110 on the node board 120 is governed through the JTAG port communicating with the service node. The service node includes a node manager 142 for managing the compute nodes and a database loader 144. The node manager includes historical information 146 about activity of the nodes, networks and queries as described further below. The node manager also includes a node map 148. The node map 148 is a list or data file that indicates a correspondence between nodes and database structures that will be loaded into those nodes. The database loader 144 comprises software in the service node 140 that operates to load the in-memory database to the memory nodes in accordance with the node map 148 as described further below.

The Blue Gene/L supercomputer communicates over several communication networks. FIG. 2 is a block diagram that shows the I/O connections of a compute node 110 on the Blue Gene/L computer system. The 65,536 computational nodes and 1024 I/O processors 170 are arranged into both a logical tree network and a logical 3-dimensional torus network. The torus network logically connects the compute nodes in a lattice like structure that allows each compute node 110 to communicate with its closest 6 neighbors. In FIG. 2, the torus network is illustrated by the X+, X−, Y+, Y−, Z+and Z− network connections that connect the node to six respective adjacent nodes. The tree network is represented in FIG. 2 by the tree0, tree1 and tree2 connections. Other communication networks connected to the node include a JTAG network and a the global interrupt network. The JTAG network provides communication for testing and control from the service node 140 over the control system network 150 shown in FIG. 1. The global interrupt network is used to implement software barriers for synchronization of similar processes on the compute nodes to move to a different phase of processing upon completion of some task. Further, there are clock and power signals to each compute node 110.

As discussed above, the node manager 142 creates and uses the node map 148. The node map is an optimal mapping of where to place the database structures in the nodes as described further below. The node map could be a simple list, index or other data structure. In addition to the historical information described above, the node manager can use other inputs to create and update the node map. Other inputs for creating the node map include forced node mapping of data structures and node mapping based the structure of the database itself and node and network information. Node mapping based on the database structure considers any relationships within the static database that would dictate system performance could be enhanced by mapping database structures in close proximity. The database structure and historical information can be used to optimize the efficiency of the node map. For example, if a field in TableA is used as a foreign key in TableB, then it may be beneficial to locate these tables on the same node or in close proximity to each other. The node file, network file, and query file contain information that can be used to enhance the efficiency of the node mapping. The node file, network file, and query file are described more below with reference to FIGS. 5-7.

Forced node mapping is where the node manager allows a database administrator to force a database structure to be placed in a particular node. This may be accomplished using a graphical user interface (GUI) that presents a graphical representation of the database to the user that looks like the block diagram of FIG. 4. The GUI would display the nodes and database structures on a display screen and allow a system administrator to pick and place the database structures. The node map would then be updated to reflect the forced mappings selected using the GUI. The forced node mapping is intended to override the node mapping that would be done by the other mapping methods, but provisions in the GUI could be used to allow other mapping methods to trump the forced node mapping.

Figure 3:
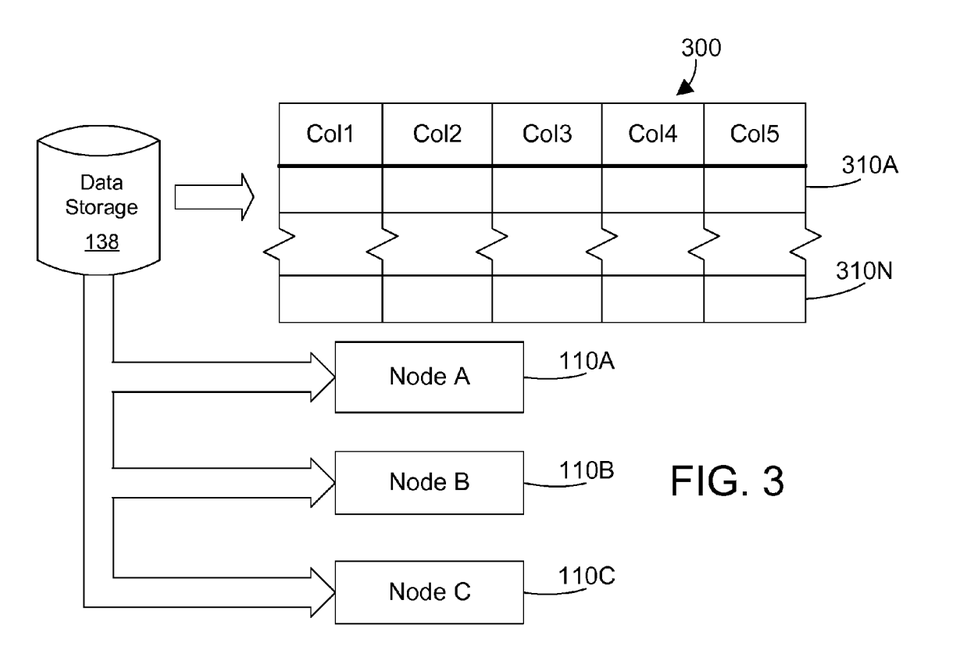
FIG. 3 is a block diagram to illustrate placing database data into an in-memory database in a massively parallel computer system.
Figure 4:
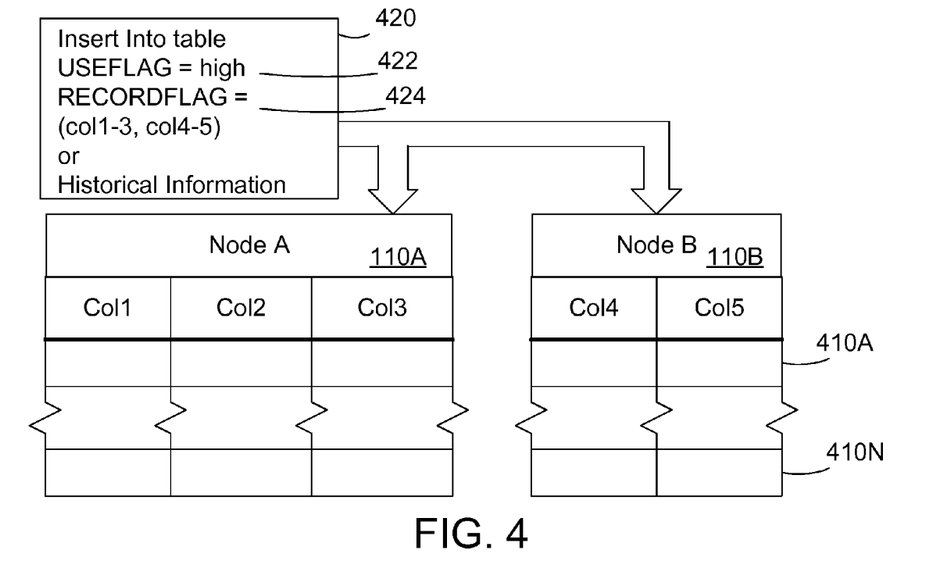
FIG. 4 shows a block diagram of a database that is split into two nodes in a massively parallel computer system.

FIGS. 3 and 4 show block diagrams with several compute nodes 110A-110C that each represent a node 110 of a parallel computer system 100 such as the Blue Gene/L computer system shown in FIG. 1. FIGS. 3 and 4 together provide a broad conceptualization of pre-loading an in-memory database, which is described in more detail below. The compute nodes 110A-110C are interconnected by one or more networks such as the torus network of the Blue Gene/L computer system as described above. Each node 110A-110C represents a fully functional computer system that has a processor and memory (not shown) as described above.

FIG. 3 illustrates loading an in-memory database from a data storage device 138 to several nodes 110A-110C. The database is a collection of data stored in the common format of rows and columns as represented by the data block 300. The database has columns of data (Col1 thorough Col5) with rows 310A through 310N. The database is initially stored in the data storage device 138 before being loading into the in-memory database in the compute nodes.

FIG. 4 represents the database from the data storage device 138 after being loaded into the in-memory database on Node A 110A and Node B 11B. In this example, the database loader 144 (FIG. 1) determined to load the first three columns (Col1, Col2, and Col3) into Node A 110A and the last two columns (Col4 and Col5) into Node B 110B. The database loader 144 determines whether to split up the data and how to split up the data depending on the frequency of access to the data, the historical use of the data by the different nodes, and from hints in the SQL insert statement as described further below. Where the frequency of accessing the data is low, the database loader may simply load the data into the next available memory location rather than use system resources to optimize the storage location for data that is rarely accessed. The database loader may fill a node completely so the next available space is in the next free node, or the database loader could fill data across all the nodes equally and leave some space available on each node to insert new data.

Data may be clustered into the in-memory database based on historical information or a hint or flag in the SQL statement as shown in FIG. 4. For example, an insert statement 420 in SQL could include a USEFLAG 422 that indicates the frequency the record will likely be accessed. The USEFLAG could be binary to indicate a high access frequency or a low access frequency. For Example, an insert statement could be of the form:

Insert Into table (col) Value (value) USEFLAG=high or low.

Alternatively, the use flag could indicate multiple levels of anticipated access frequency and be of the form:

Insert Into table (col) Value (value) USEFLAG=n; where n is an integer between 1 and 10.

Similarly, an insert statement in SQL could include a RECORDFLAG 424 that indicates how the data in the record will likely be accessed. The RECORDFLAG 424 would indicate whether the application will most often access the data by the record or by the column of data. The RECORDFLAG 424 could indicate a range of columns where the data in the range of columns will likely be accessed together and should be clustered together. For Example, an insert statement could be of the form:

Insert Into table (col) Value (value) RECORDFLAG=col1-col3, col4-col5, or

Insert Into table (col) Value (value) RECORDFLAG=record

Figure 5:
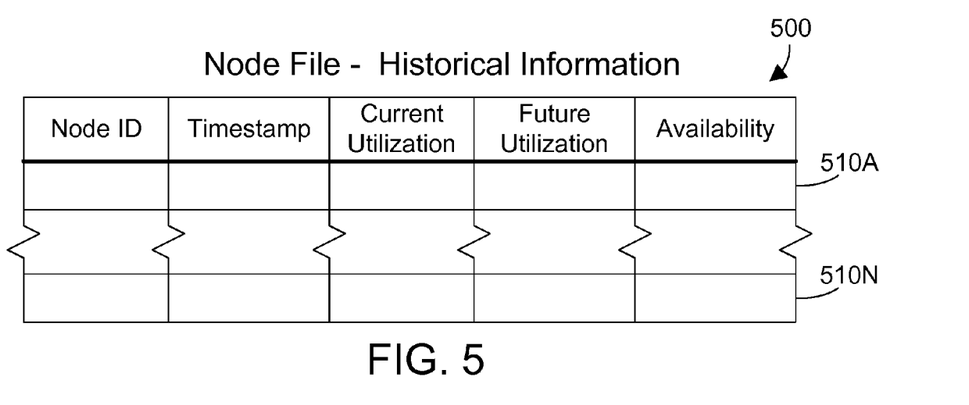
FIG. 5 represents a node file that is updated by the node manager with information about nodes and their utilization.
Figure 6:
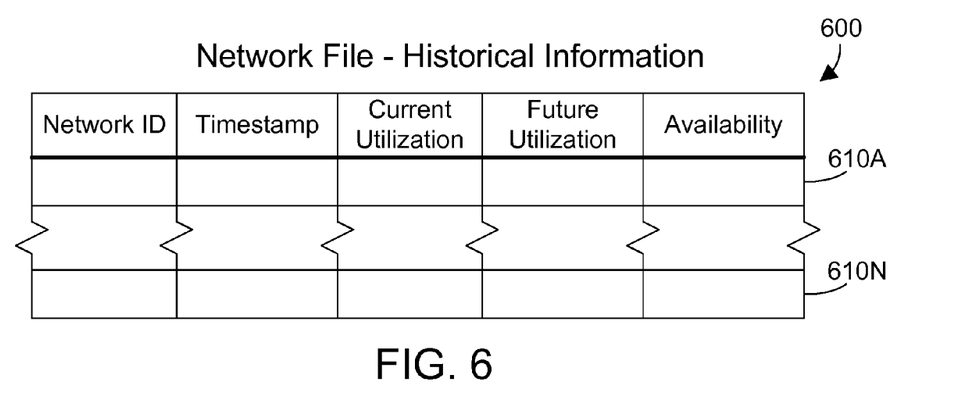
FIG. 6 represents a network file that is updated by the node manager with information about network structures and utilization.
Figure 7:
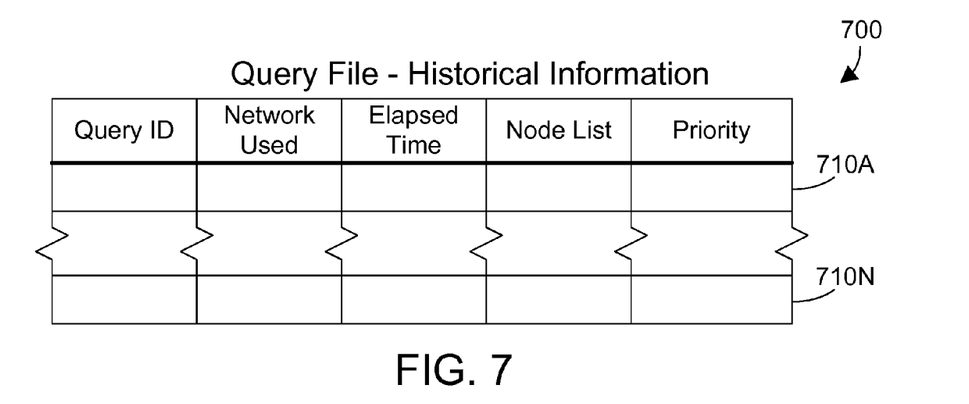
FIG. 7 represents a query file that is updated by the node manager with information about queries.

FIGS. 5 through 7 illustrate three different files that store historical information that can be used to determine how to pre-load the in-memory database. These files contain historical information (146 in FIG. 1) that is stored by the node manager (142 in FIG. 1). The information may be collected by the node manager or other processes that are running on the computer system.

FIG. 5 illustrates a node file 500 that is used to pre-load an in-memory database. The node file 500 contains records 510A through 510N that have information about the nodes and their utilization in the computer system. The records 510A through 510N in the node file 500 contain information such as the node ID, a time stamp, the current utilization of the node, the future utilization of the node, and the node availability. The node ID stores a node identifier for the node record 510A-510N at the time indicated by the timestamp. The current utilization represents how busy the node is in terms of CPU utilization. The node utilization could also represent the amount of memory being used, or some combination of factors. Where possible, the future utilization of the node is predicted and stored. The availability of the node indicates whether the node is available or not. An unavailable node may be reserved or non-operable.

FIG. 6 illustrates a network file 600 that is used to pre-load an in-memory database. The network file 600 contains records 610A through 610N that have information about the networks in the computer system. The records 610A through 610N in the network file 600 contain information such as the network ID, a time stamp, current utilization, future utilization and network availability. The current utilization represents how busy the network is in terms of bandwidth utilization. Where possible, the future utilization of the network is predicted and stored. Similar to the node availability described above, the availability of the network indicates whether the network is available or not.

FIG. 7 illustrates a query file 700 that is used to optimally pre-load an in-memory database. The query file 700 contains records 710A through 710N that have historical information about queries that have executed on the computer system. The records 710A through 710N in the query file 700 contain information such as the query name or ID, the network used, the elapsed time used for the query to execute on the node, the node list for the query, and the query priority. The network used is the name or ID of the network that the query uses to access the database structure needed for the query. The node list is a list of nodes that contain the database structure or are otherwise needed to execute the query. The query priority is an optional attribute specified by a user that indicates the importance of the query. Query history information from higher priority queries is more significant in determining the data to node mapping.

Future network utilization discussed above could be predicted based on previous statistics stored in the network file. Predicted future network utilization could also be based on history if the application has been run before or has an identifiable pattern, and could be based on information provided about the application. For example, certain types of applications traditionally execute specific types of queries. Thus, financial applications might execute queries to specific nodes while scientific applications execute queries to all of the nodes. Future node utilization could similarly be predicted.

Figure 8:
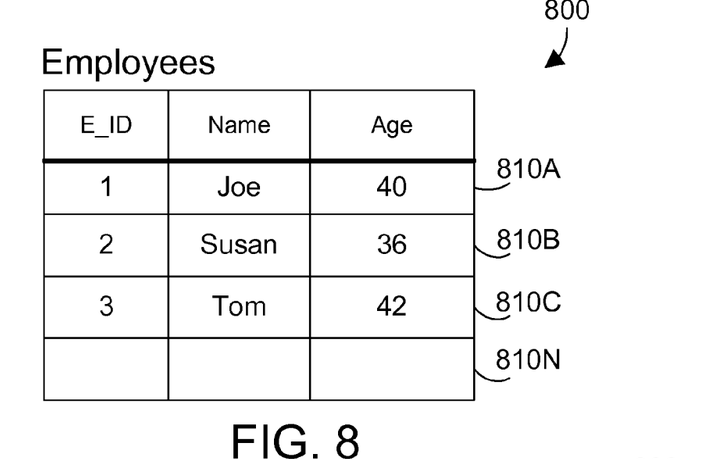
FIG. 8 shows a database of information to illustrate an example of inserting data into an in-memory database.
Figure 9:
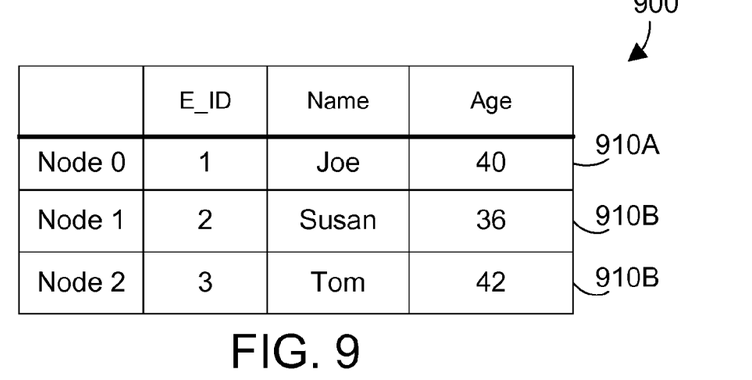
FIG. 9 shows the database information in FIG. 8 arranged in an in-memory database.
Figure 10:
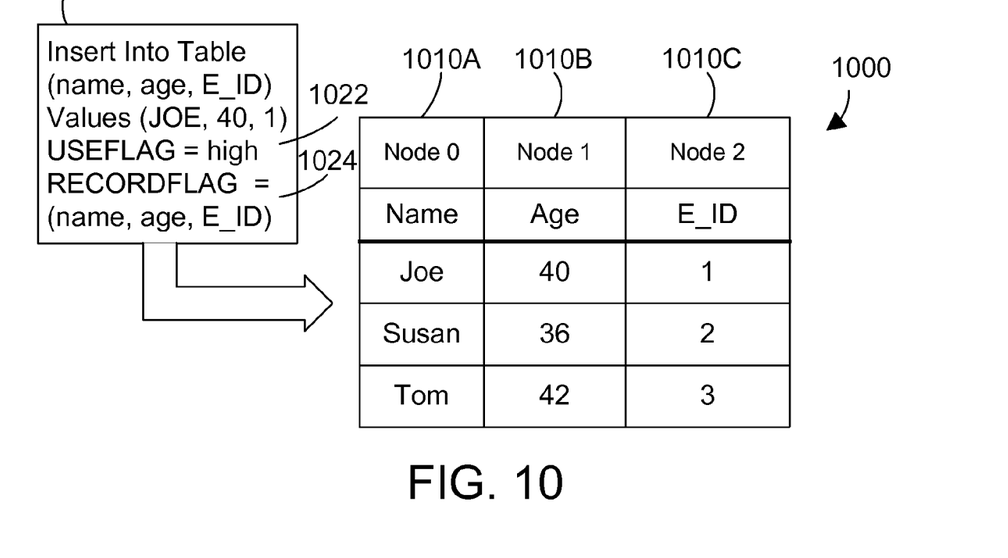
FIG. 10 shows another example of the database information in FIG. 8 arranged in an in-memory database.

FIGS. 8, 9 and 10 illustrate an example of loading an in-memory database as claimed herein. FIG. 8 illustrates a table 800 of information named "Employees". The data in the table is to be loaded into an in-memory database. The table 800 includes rows of data 810A through 810C, where each row represents a data record for an employee. The row 810N indicates that there could be more records in the table. Each row of data in the table 800 includes an employee identification number (E_ID), and an employee name and age for the employee corresponding to the employee identification number.

FIG. 9 shows a first example of how the data in the table shown in FIG. 8 may be loaded into an in-memory database. In this example, we assume that the layout in the in-memory database is to be optimized. The determination to optimize loading the data could be determined from a use flag in the SQL insert statement or due to a historical use pattern. Further, in this example, it is assumed that a historical use pattern or an SQL record flag indicates that the application most often accesses the information by record (i.e. querying all the information in a tuple). This means the data should be distributed across the nodes such that each node contains all of the information for one record, but the records as a whole can be spread across the nodes. In this case, the database loader will optimize the data placement into the in-memory database by placing complete records together in available memory of one or more nodes as shown in the table 900 of FIG. 9. The table shows that the data for each row 910A through 910C is stored in a single node as indicated by the node location in the first column 912.

FIG. 10 shows a second example of how the data in the table shown in FIG. 8 may be loaded into an in-memory database. In this example, we also assume that the layout in the in-memory database is to be optimized. Further, in this example, it is assumed that a historical use pattern or an SQL query 1020 indicates that the application often accesses the data and most often accesses the information by individual attribute of the record (i.e. querying all the information of a column). In this example, the query 1020 indicates with a USEFLAG=High 1022 that the query is accessed often. Further the query 1020 indicates with the RECORDFLAG 1024 that the query most often access the information in each column separately. This means the data should be distributed across the nodes such that attributes (data in a column) are clustered together. In this case, the database loader will optimize the data placement into the in-memory database by placing the attributes of all the records together in available memory of one or more nodes as shown in the table 1000 of FIG. 10. Table 1000 shows that the data for the attribute "Name" in column 1010A is stored on Node 0, the data for the attribute "Age" in column 1010B is stored on Node 1, and the data for the attribute "E_ID" in column 1010C is stored on Node 2.

Figure 11:
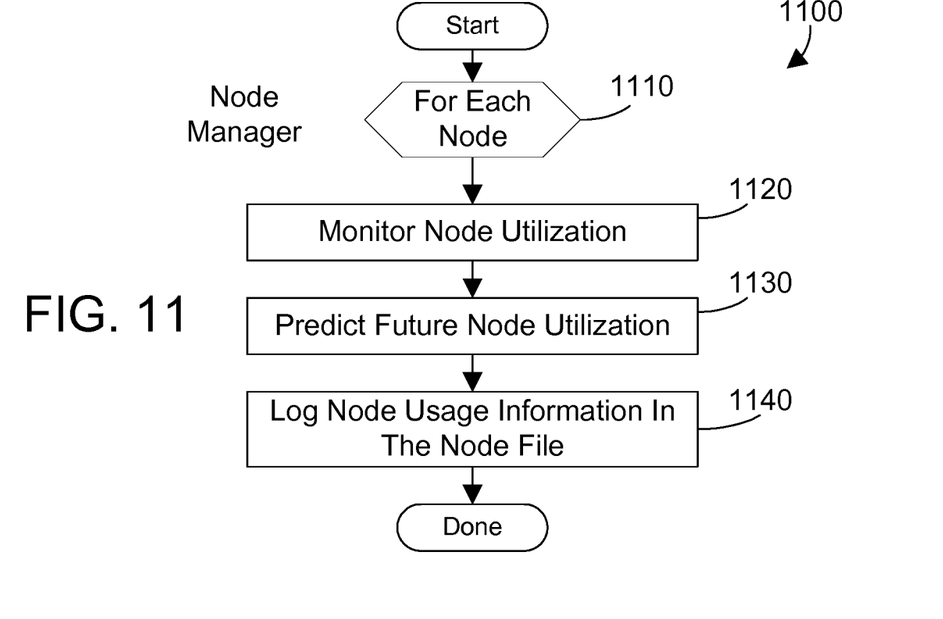
FIG. 11 is a flow diagram of a method for a node manager to store node information that will be used to pre-load an in-memory database.
Figure 12:
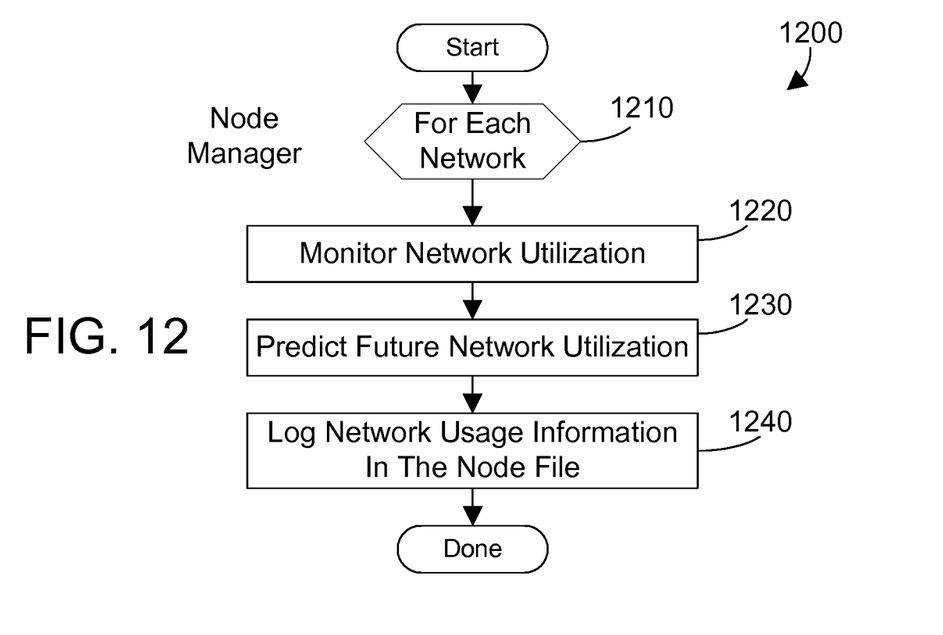
FIG. 12 is a flow diagram of a method for a node manager to store network information that will be used to pre-load an in-memory database.
Figure 13:
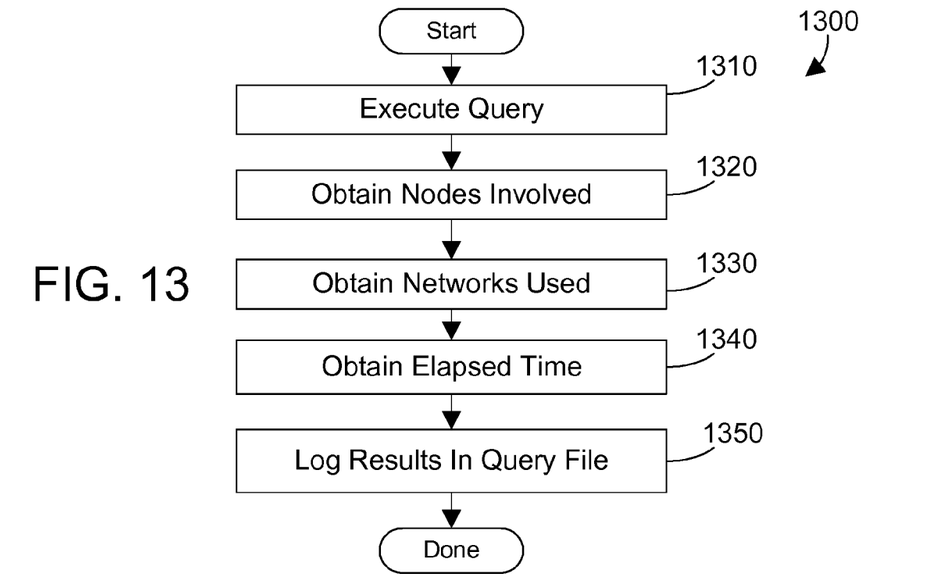
FIG. 13 is a flow diagram of a method for obtaining and storing information about queries.

FIGS. 11-13 show methods for collecting node, network and query information that can be used to optimize placement of data in the in-memory database across multiple nodes. For example, historical information about how a query accesses data can be used in the place of the USEFLAG to determine how to cluster data columns as described in the above examples. The node and network information can be used to determine what networks are available and the logical proximity of nodes to increase the efficiency of the data placement in the in-memory database.

FIG. 11 shows a method 1100 for preparing node information to be used to determine optimal pre-loading of an in-memory database. The steps in method 1100 are performed for each node in the computer system or in a partition of the computer system being pre-loaded (step 1110). First, monitor the node utilization of each node (step 1120). Next, where possible, predict future node utilization based on the past utilization and other available information about the nodes and node architectures (step 1130). Then log the node usage statistics in the node file (step 1140). The method is then done.

FIG. 12 shows a method 1200 for preparing network information to be used to determine optimal pre-loading of an in-memory database. The steps in method 1200 are performed for each network in the computer system or in a partition of the computer system being pre-loaded (step 1210). First, monitor the utilization of each network (step 1220). Next, where possible, predict future network utilization based on the past utilization and other available information about the networks (step 1230). Then log the network usage statistics in the network file (step 1240). The method is then done.

FIG. 13 shows a method 1300 for preparing query information to be used to determine optimal pre-loading of an in-memory database. First, execute the query (step 1310). Next, obtain a list of all the nodes involved in the query (step 1320). Then obtain a list of the networks used in the query (step 1330). Also obtain the elapsed time to execute the query (step 1340). Then log the query information in the query file (step 1350). The method is then done.

Figure 14:
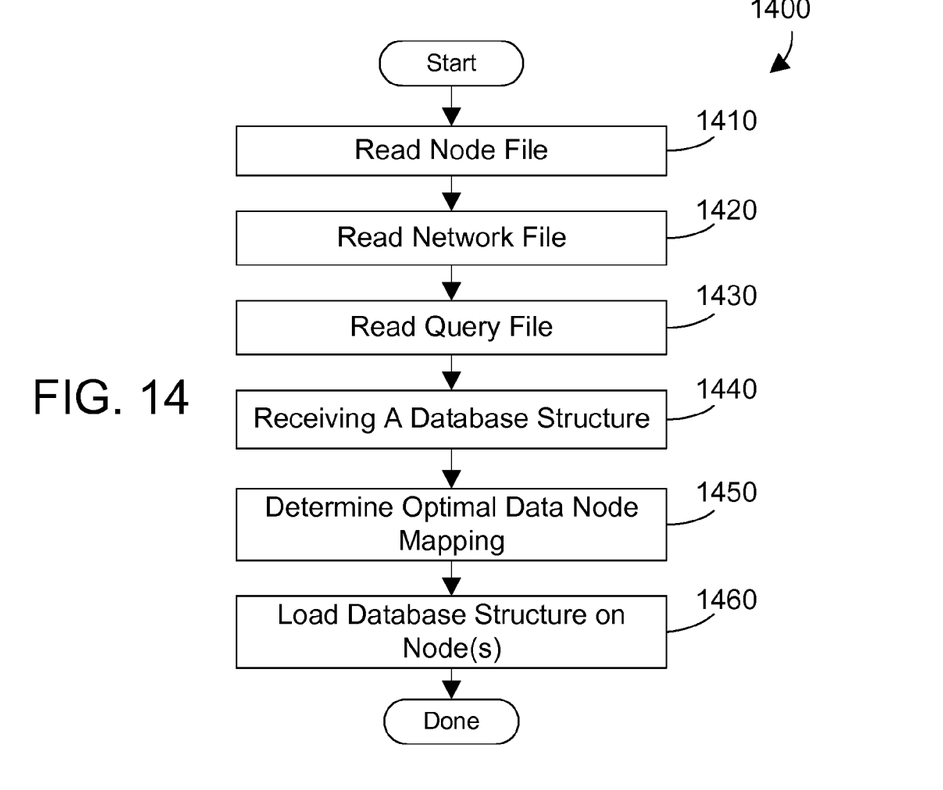
FIG. 14 is a flow diagram of a method for pre-loading an in-memory database.

FIG. 14 shows a method 1400 for pre-loading an in-memory database. First, read the node file (step 1410), then read the network file (step 1420) and read the query file (step 1430). These files are those illustrated in FIGS. 5 through 7 and described above. Next, receive the database structure that is to be loaded into the in-memory database (step 1440). Determine the optimal data node mapping (step 1450), meaning to determine what node or nodes is the optimal place to store the database structure read in step 1440 into the in-memory database. Then load the database structure on the optimal nodes (step 1460) and the method is then done.

Figure 15:
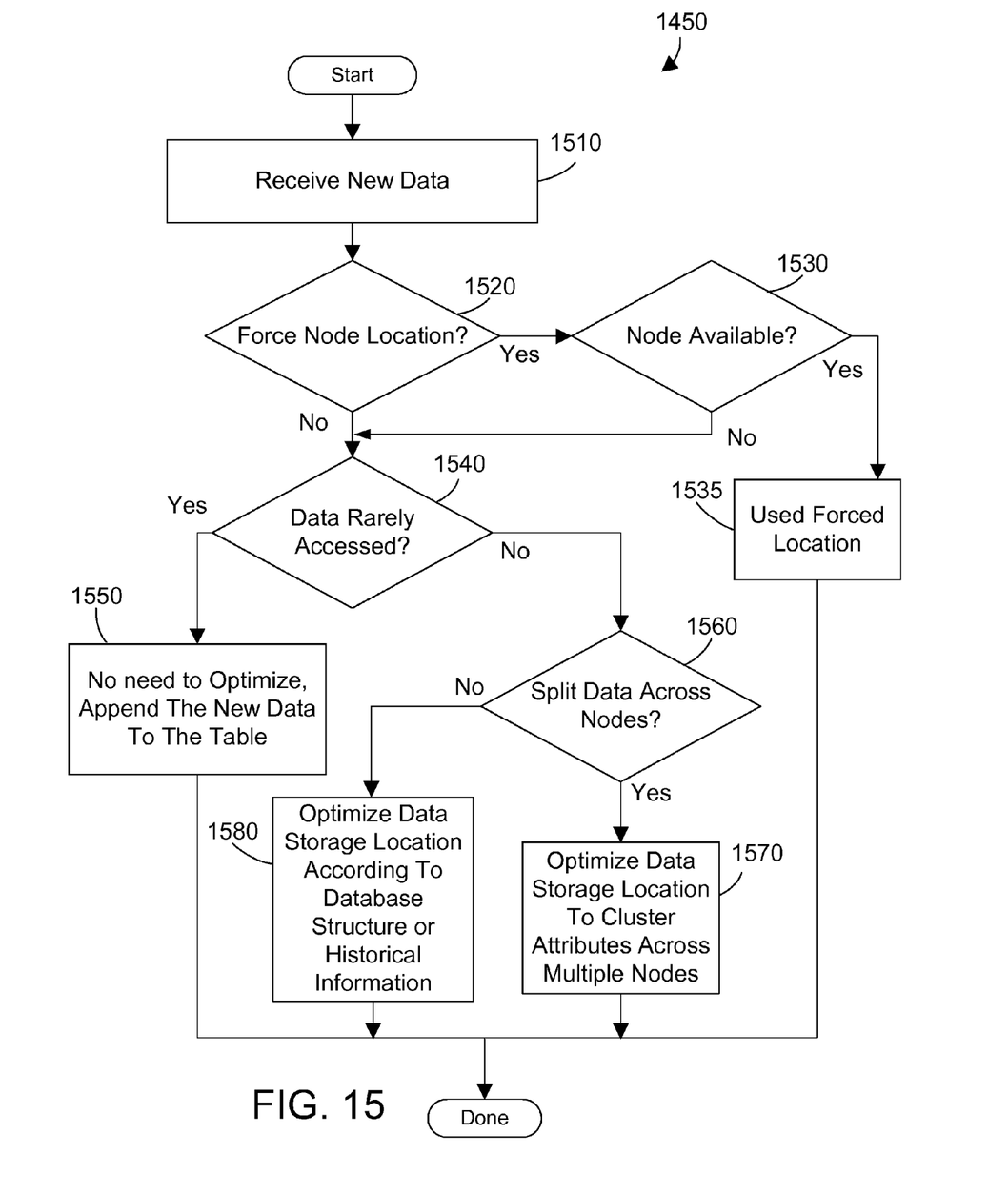
FIG. 15 is a flow diagram of a method for determining optimal data node mapping for pre-loading an in-memory database.

FIG. 15 shows a method 1550 as one possible implementation for step 1450 in FIG. 14. Method 1550 illustrates a method for determining the optimal data node mapping for an in-memory database. This method would be executed by the database loader 144 on the service node 140 shown in FIG. 1. This method is executed for each database record to be placed in the in-memory database. First, get the database structure to be placed in the in-memory database (step 1510). Next, if there is a force node location for this node (step 1520=yes), then check if the node is available (step 1530). If the node is available (step 1530=yes) then used the forced location (step 1535) and the method is done. If the node is not available (step 1530=no), or if there is no force node location (step (1520=no) then go to the next step (1540). If the data is rarely accessed (step 1540=yes), then append the new data to any available location in the table since there is no need to optimize the data location (step 1550). If the data is accessed often (not rarely accessed) (step 1540=no), then check if the data can be split across multiple nodes (step 1560). If the data can be split across multiple nodes (step 1560=yes) then optimize the data storage location across multiple nodes (step 1570) and the method is then done. If the data can not be split across multiple nodes (step 1560=no) then optimize the data storage location according to database structure or historical information where it is available (step 1580) and the method is then done.

An apparatus and method is described herein for adding data across multiple nodes to an in-memory database in a parallel computing system. The database loader uses SQL flags, historical information, and node and network configuration to determine how to effectively cluster data attributes across multiple nodes to increase the efficiency of executing queries on the database.

One skilled in the art will appreciate that many variations are possible within the scope of the claims. Thus, while the disclosure has been particularly shown and described above, it will be understood by those skilled in the art that these and other changes in form and details may be made therein without departing from the spirit and scope of the claims.

The invention claimed is:

1. A parallel computer system comprising:
   an in-memory database in the memory of a plurality of fully functional compute nodes;
   a database loader for pre-loading the in-memory database to optimize database efficiency by clustering database attributes into the in-memory database, wherein clustering database attributes comprises placing data corresponding to a first attribute for a plurality of records together on a first compute node of the computer system and placing data corresponding to a second attribute for the plurality of records together on a second compute node of the computer system; and
   wherein the database loader clusters the database attributes based on a use flag in an SQL statement that indicates an anticipated access frequency of placing a record of the plurality of records in the in-memory database.

2. The parallel computer system of claim 1 wherein the parallel computer system is a massively parallel computer system.

3. The parallel computer system of claim 1 wherein the database loader further clusters the database attributes based on a record flag in the SQL statement that initiates placing a range of columns of the data that should be clustered together in the in-memory database.

4. The parallel computer system of claim 1 wherein the database loader determines to cluster the database attributes based on node information comprising node identification, timestamp, current utilization, future utilization and availability.

5. The parallel computer system of claim 1 wherein the database loader determines to cluster the database attributes based on network information comprising network identification, timestamp, current utilization future utilization and availability.

6. The parallel computer system of claim 1 wherein the database loader determines to cluster the database attributes based on query information comprising query identification, network used, elapsed time, node list and priority.

7. A computer-readable article of manufacture comprising:
   a database loader for pre-loading an in-memory database in memory of a plurality of compute nodes of a parallel computer system to optimize database efficiency by clustering database attributes, wherein clustering database attributes comprises placing data corresponding to a first attribute for a plurality of records together on a first compute node of the computer system and placing data corresponding to a second attribute for the plurality of records together on a second compute node of the computer system;
   wherein the database loader clusters the database attributes based on a use flag in an SQL statement that indicates an anticipated access frequency of placing a record of the plurality of records in the in-memory database; and
   non-transitory computer recordable media bearing the database loader.

8. The article of manufacture of claim 7 wherein the database loader further clusters the database attributes based on a record flag in the SQL statement that initiates placing a range of columns of the data that should be clustered together in the in-memory database.

9. The article of manufacture of claim 7 wherein the database loader determines to cluster the database attributes based on node information comprising node identification, timestamp, current utilization, future utilization and availability.

10. The article of manufacture of claim 7 wherein the database loader determines to cluster the database attributes based on network information comprising network identification, timestamp, current utilization future utilization and availability.

11. The article of manufacture of claim 7 wherein the database loader determines to cluster the database attributes based on query information comprising query identification, network used, elapsed time, node list and priority.

12. A massively parallel computer system comprising:
   an in-memory database in the memory of a plurality of fully functional compute nodes in the massively parallel computer system;
   a database loader for pre-loading the in-memory database to optimize database efficiency by clustering database attributes into the in-memory database, wherein clustering database attributes comprises placing data corresponding to a first attribute for a plurality of records together on a first compute node of the computer system and placing data corresponding to a second attribute for the plurality of records together on a second compute node of the computer system, wherein the database loader determines to cluster the database attributes based on historical information for accessing the database, wherein the historical information comprises node information, network information and query historical information;
   wherein the database loader clusters the database attributes based on a use flag in an SQL statement that indicates an anticipated access frequency of placing a record of the plurality of records in the in-memory database; and
   wherein the database loader further clusters the database attributes based on a record flag in the SQL statement that initiates placing a range of columns of the data that should be clustered together in the in-memory database.

13. The parallel computer system of claim 12 wherein the node information includes node identification, timestamp, current utilization, future utilization and availability.

14. The parallel computer system of claim 12 wherein the network information includes network identification, timestamp, current utilization future utilization and availability.

15. The parallel computer system of claim 12 wherein the query information includes query identification, network used, elapsed time, node list and priority.

* * * * *